Oct. 19, 1965 E. I. MOSER ETAL 3,213,415
PRESSURE EQUALIZING ARRANGEMENT FOR ACOUSTIC LOGGING
Filed Aug. 27, 1962 3 Sheets-Sheet 1
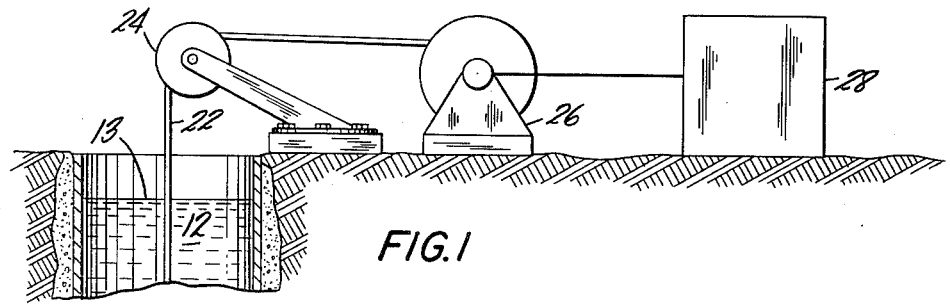
FIG. 1
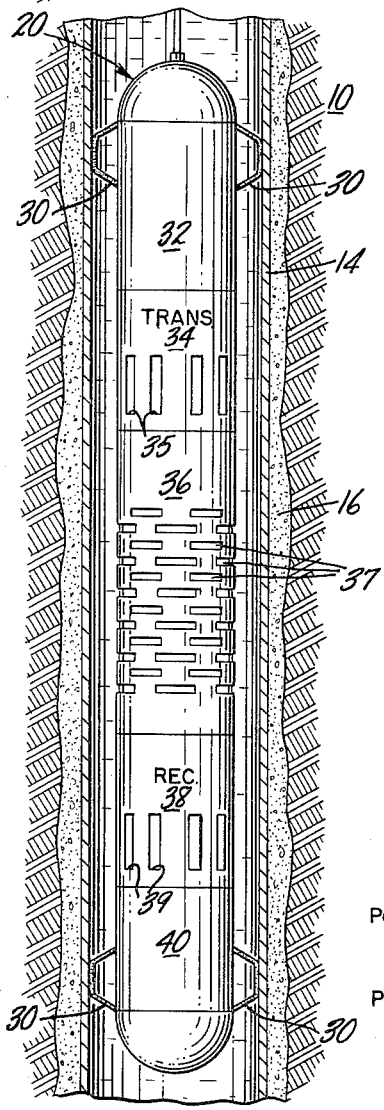
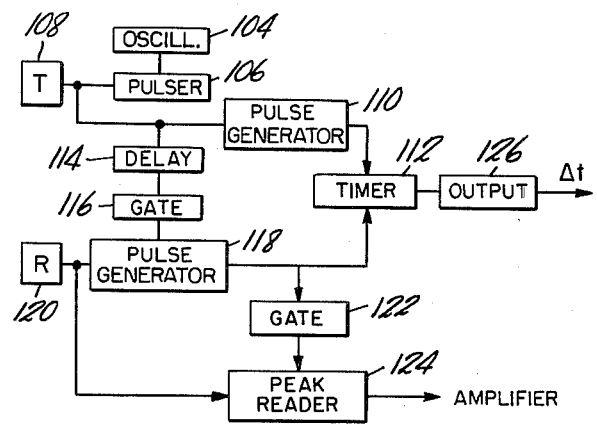
FIG. 3
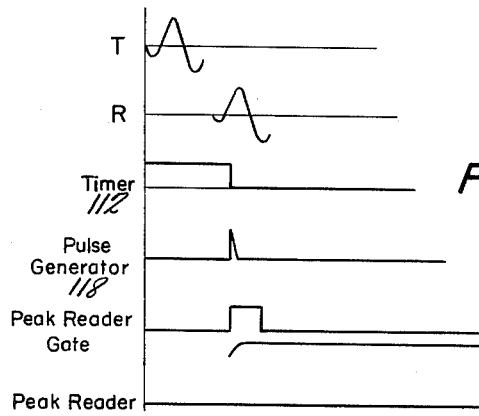
FIG. 4
INVENTORS
EDWARD I. MOSER &
GERALD S. BAKER
BY
*Brumbaugh, Free, Graves & Donohue*
their ATTORNEYS

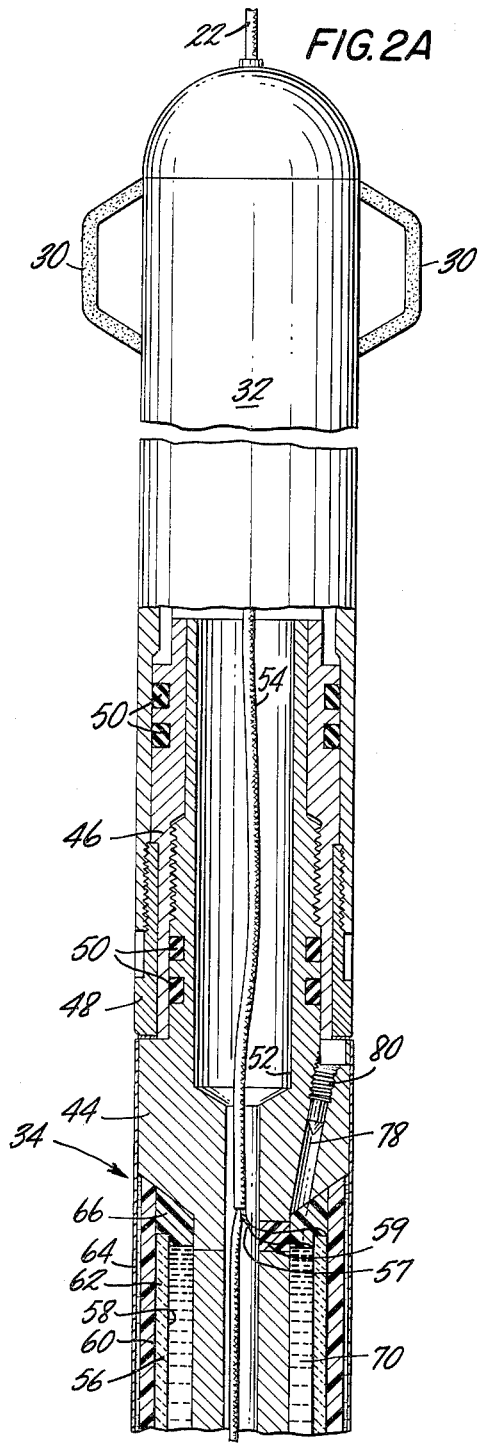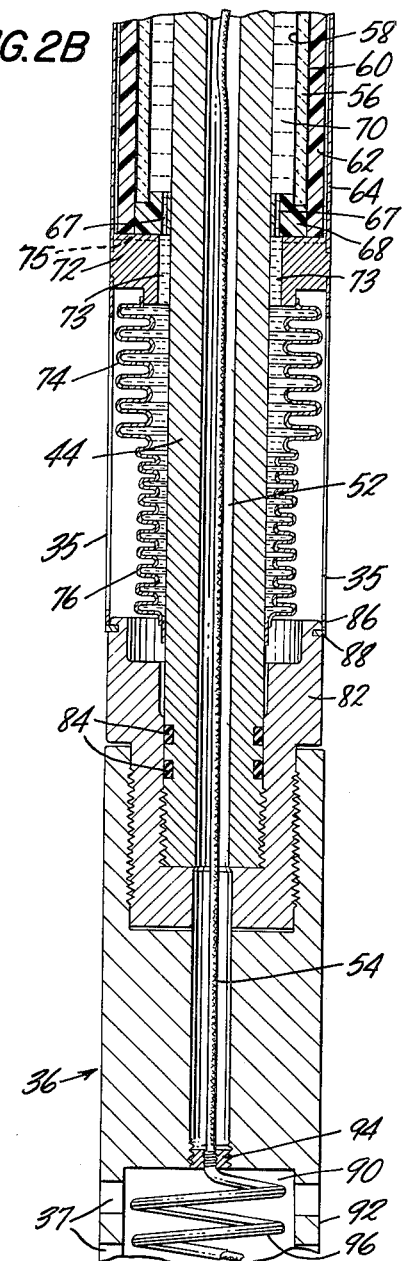

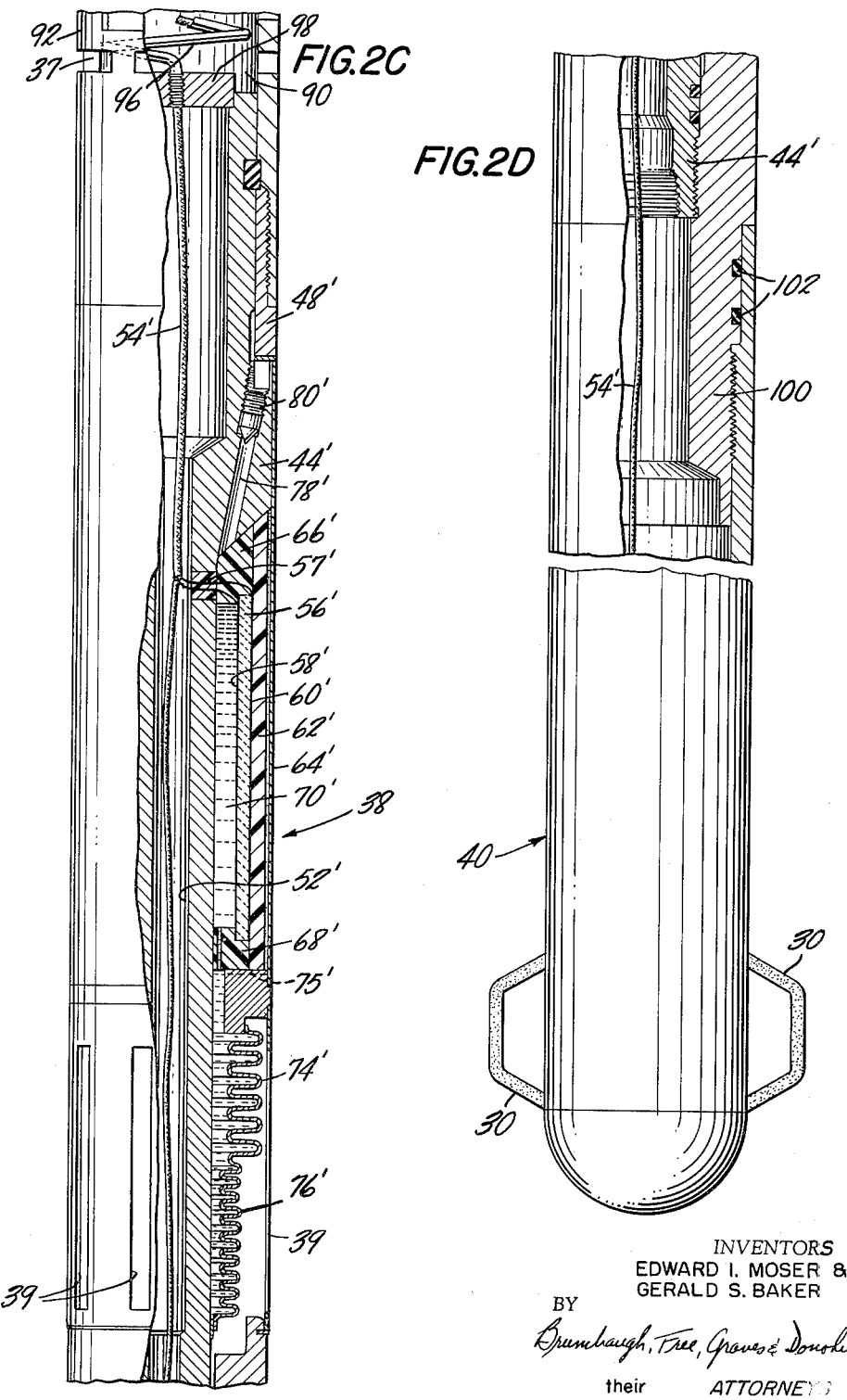

United States Patent Office 3,213,415
Patented Oct. 19, 1965

3,213,415
PRESSURE EQUALIZING ARRANGEMENT FOR ACOUSTIC LOGGING
Edward I. Moser and Gerald S. Baker, Houston, Tex., assignors to Schlumberger Well Surveying Corporation, Houston, Tex., a corporation of Texas
Filed Aug. 27, 1962, Ser. No. 219,675
12 Claims. (Cl. 340—17)

This invention relates to well logging apparatus, and more particularly to means for investigating the properties of materials adjacent the well bore in terms of their effects on acoustic energy transmitted therethrough.

The determination of the acoustical properties of geological formations traversed by a bore hole has proved to be a valuable investigative technique. By measuring such factors as attenuation and velocity of acoustic waves passing through the formations surrounding the bore hole, the character and constituents of the formations may be determined. Another important area wherein acoustic logging techniques have been found extremely advantageous is in what is known as cement bond logging.

Once an oil bearing stratum has been located along a bore hole, it is desirable to isolate the production zone of the formation from the other non-productive zones, to prevent undesirable mixing of the fluids which may be contained therein with the oil. This is accomplished by cementing the interior surface of the bore hole to seal the formations. The cement is inserted between a well casing and the interior surface of the bore hole and, if the cementation is complete and effective, it will become firmly bonded to the well casing. It has been found that the decrease in strength of an acoustic signal in a firmly cemented well casing is substantially greater than that afforded by a casing to which the cement is not firmly bonded. Therefore, by making an acoustic log along the length of a cemented well, and measuring the amplitude of the acoustic signals after conduction through the casing, it can be accurately determined where the cement bonding is firm and complete and where an inadequate bond exists.

In general, the apparatus for making an acoustic log consists of a transmitter capable of providing acoustical impulses, and at least one receiver responsive to acoustical energy, both mounted on a support for movement through the length of the well casing. The transmitter and receiver are spaced apart by a fixed distance and as the support is moved through the well casing, the energy from acoustic pulses periodically generated by the transmitter is picked up at the receiver after transmission through the well casing. The amplitudes of the received signals are correlated with the depth in the well casing to provide a log indicating the qualities of the cement bonding to the casing over the length of the casing.

The acoustic transmitters and receivers employed for these purposes usually comprise a piezoelectric or magnetostrictive element which, in the case of the transmitter, is actuated by an electrical impulse to generate an acoustic wave and which, in the case of the receiver, is responsive to acoustical energy impinging thereon to generate an electrical signal generally proportional to the intensity of the acoustic energy. For effective operation of these components, it is necessary that they be both efficiently coupled to the surrounding media and at the same time carefully protected from the deleterious effects of the liquids and gases present in well bores or casing. These requirements present problems, especially in view of the temperature and pressure variation encountered as the support moves through different levels in the well bore. The apparatus must not only be impervious to the well bore fluids but must be able to accommodate the changing pressures without affecting the acoustic properties thereof.

In prior art devices, flexible elastomer covers were used to enclose transducer elements in an oil. While these covers were liquid tight, they did not prevent gases in the bore hole fluid from permeating under the high pressures encountered, the gases going into solution in the oil. Hence, when the logging tool was withdrawn from the well bore, the gases could not leave at a rate adequate to prevent bursting of the cover. Moreover, earlier types of logging tools were difficult to repair by virtue of the techniques employed to seal them against well fluids and to equalize interior and exterior pressures.

Accordingly, it is the primary object of the present invention to provide improved acoustic well logging apparatus capable of efficient and accurate operation under all types of conditions encountered in well bores.

A further object of this invention is to provide an improved well logging tool for acoustic well logging purposes.

Yet another object of this invention is to provide an improved acoustical transducer unit for use in a well logging apparatus.

Another object of the present invention is to provide improved means for sealing the working parts of a well logging tool against the action of liquids and gases encountered in a well bore.

Still another object of the present invention is to provide an improved well logging tool including readily separable acoustic transmitter and receiver units and provided with removable cover plates for easy access to internal components.

In accordance with the present invention, a well logging tool or sonde includes a pair of similar transducer elements, spaced apart thereon, one of which serves as the acoustic transmitter and the other as the acoustic receiver. The transducer elements comprise basically a hollow cylindrical member of piezoelectric or magnetostrictive material disposed within the tool and coaxial therewith. The tool itself includes a central supporting mandrel around which the transducer element is mounted to provide an annular cavity therebetween. The cavity is completely filled with an electrically non-conduction liquid such as silicone oil which is also relatively compressible.

Surrounding the transducer element is an annular spacer, such as Teflon or other plastic material. An outer sleeve of stainless steel or the like protects the entire assembly from the liquids and gases in the bore hole. The Teflon spacer not only serves to protect the transducer element, but also is believed to act in an impedance matching capacity to improve the output characteristics thereof. The stainless steel outer skin is slightly spaced from the Teflon spacer and sufficiently thin and elastic so as to transfer acoustic energy to the well fluid.

For effective operation of the transducer element, it is necessary that the pressure in the transducer cavity be equalized with the pressure of the well bore fluids. To maintain the balance with the varying pressures encountered at different depths in the well, a double bellows arrangement is utilized. A relatively large capacity bellows is arranged within the tool in fluid communication with the oil-filled cavity containing the transducer. A second and smaller bellows is provided as a continuation of the larger bellows and is sealed at one end to the inner supporting mandrel of the sonde. The entire cavity, including the interior of the transducer and of the two bellows, is filled with the oil. With the bellows exposed to the bore hole fluid, the external pressures are communicated to the oil in the cavity, thereby maintaining both internal and external pressures substantially equal. The differential in area between the small and large bellows enable expansion and contraction of the large bellows without the need of a sliding seal, and consequently the entire structure can more readily be made completely fluid tight.

The bellows structure, which of course must be exposed to the bore hole fluid, is surrounded by a slotted stainless steel cover plate held in place by a snap ring, and may be easily removed to permit cleaning of the bellows surfaces. Furthermore, the entire sonde is fabricated in separate, threadedly engaged sections, so arranged that the individual transmitter and receiver units may be easily removed and replaced. This of course permits repairs and adjustments of these units to be made while the remainder of the sonde structure is being used with other transducer units.

The foregoing and other features, advantages, and objects of the invention will become more readily apparent from the following more detailed description thereof, when taken in conjunction with the accompanying drawings, in which:

FIGURE 1 is a cross sectional view through a bore hole in the earth showing the well logging tool of the invention in operative position;

FIGURES 2A through 2D together are a partial cross section through the well logging tool showing the inner construction thereof;

FIGURE 3 is a block diagram of the electrical circuitry of the acoustic logging apparatus when used for cement bond logging; and FIGURE 4 is a series of wave forms useful in explaining the operation of the circuit of FIGURE 3.

For illustrative purposes, the invention will be described in connection with its use in a cement bond log application, although it is to be understood that it is equally advantageous when applied to other acoustic logging functions. In FIGURE 1, a bore hole 12 is shown traversing the earth formations 10. The bore hole 12 is provided with a steel casing or liner 14, in well known fashion, and a layer of cement 16 provided to seal the adjacent formations. The casing is filled with the usual bore hole fluid 13. In the example to be described, the logging tool provides indications of the quality of the bonding of the cement layer 16 to the casing 14.

The logging tool, indicated generally at 20, is moved through the bore hole 12 by a cable 22 which is drawn over a sheave 24 and wound on cable drum 26. In addition to supporting the logging tool 20, the cable 22 carries one or more electrical conductors for carrying electrical signals from the logging tool to the recorder 28 at the surface of the earth and electrical power from the surface to the tool. The signals may be coupled from the cable through slip rings or the like on the drum 26 and thence to the recording apparatus.

As shown in FIGURE 1, the logging tool 20 comprises an elongated, generally cylindrical body adapted to move freely through the bore hole 12. At the upper and lower ends of the tool are provided a plurality of spaced centralizing elements 30, which, for example may be of rubber and maintain the tool centrally located within the well bore without interfering with its freedom of motion therethrough.

The logging tool itself is divided generally into a plurality of separate portions. Upper segment 32 contains the electronic circuitry carried by the tool, which will be described hereinafter in connection with FIGURE 3. Below this section, are the transmitter portion 34 and receiver portion 38, which are spaced from one another by an acoustic energy isolating section 36. The staggered horizontal slots 37 in the isolating section 36 serve to breakup any direct acoustic transmission path through the tool itself between the transmitter and receiver, so that no significant directly transmitted signal will reach the receiver until after the desired signal has been received. The vertical slots 35 and 39, in the transmitter receiver sections respectively, permit the well fluid to reach the bellows structure to be described hereinafter.

At the lower end of the tool 20 is disposed a conventional casing collar locator 40, of any suitable type. For example, the apparatus 40 may consist of a magnetic arrangement which utilizes the casing 14 as part of a magnetic circuit. When the tool passes a casing collar joining two abutting sections of the casing, the properties of the magnetic circuit will change, providing an indication which is transmitted to the surface of the earth. These indications provide a measurement of the depth of the tool in the well bore.

Turning now to FIGURES 2A and 2B, which when arranged vertically in end to end relation illustrate the upper half of the tool 20, a stainless steel mandrel 44 threadedly engages at its upper end an adapter sleeve 46. A split ring coupling element 48 surrounds the adapter 46 and is provided with a threaded portion at its upper end to engage the end portion of the housing enclosing the electronic circuit portion 32 of the apparatus. With the upper portion 32 screwed tightly to the split ring coupler 48, the latter tightly engages the adapter 46 and thus firmly connects the portion 32 to the mandrel 44. Suitable sealing rings 50 may be provided between the several cylindrical members to make the connections therebetween fluid tight.

The mandrel 44 is provided with an axial bore 52 extending completely therethrough for accommodating the electrical conductors connected to the various components of the tool, i.e., the casing collar locator 40, the receiver 38, and the transmitter 34.

The transmitting and receiving transducers are substantially identical in form. The former is shown in FIGURES 2A and 2B and comprises a cylindrical sleeve of a material, such as barium titanate ceramic, capable of transducing electrical signals into mechanical or acoustic vibration, and conversely, in the case of the receiver, mechanical vibrations into electrical signals. The ceramic sleeve 56 is provided with inner and outer conductive coatings, 58, 60, respectively, which are connected by wires 57 to the conductor 54, through a hermetically sealed, pressure tight plastic interconnector in the mandrel 59. Annular support rings 66, 68 of a nonconducting material such as Teflon, support the ceramic sleeve 56 at its upper and lower ends respectively, in spaced relation to the mandrel 44.

Surrounding the ceramic sleeve 56 is a nonconductive tubular member 62, whch may also be made of Teflon, and which is in close contact with the outer surface of the ceramic member. A stainless steel sleeve 64 hermetically seals the transducer structure. The Teflon sleeve 62 is so dimensioned as to leave an annular space between its outer surface and the inner surface of the sleeve 64 having a thickness in the order of .030 inch.

An annular steel ring 72 surrounds the mandrel 44 to provide a lower support for the entire transmitter structure described above. Suitable recesses are provided in its outer surface to support the steel plate 64. The lower end of the annular ring 72 is provided with a shoulder which is engaged by the upper rim of a bellows 74, which may be made of a corrosion-resistant metal such as copper or stainless steel. The bellows surrounds the mandrel 44 to define an annular space therebetween. A second bellows 76, of smaller diameter, has its upper end fastened to the lower end of the bellows 74. The lower end of bellows 76 is in turn secured at its lower periphery to the mandrel 44.

The steel ring 72 is provided with a plurality of ports 73 which communicate with similar ports 67 in the lower support member 68. Openings 75 in ring 72, shown by dotted lines fluidly connect the annular space between the spacer 62 and cover 64 via ports 67 with the cavity 70. A fluid chamber is thus established including the annular cavity 70, the narrow space between spacer 62 and cover 64, and the interior of the bellows 74 and 76. An access port 78 is provided at the upper end of the transmitter structure for enabling the filling of the chamber with a suitable liquid, such as a silicone oil. A plug 80 is provided to seal the access port 78 once the chamber is completely filled. It will be realized, of course, that the connections between the bellows members, the annular ring 72 and the mandrel 44 are all made liquid and gas tight by welding or the like. In practice, the annular space is filled with oil by first drawing a vacuum in the chamber and then immersing the entire transmitter structure in a tank containing the oil under slight pressure. When the space is completely filled with oil, the plug 80 is reinserted to seal the chamber.

The lower end of the mandrel 44 threadedly engages a coupling member 82 and the joint therebetween is provided with a pair of sealing rings 84 to produce a fluid tight connection. A stainless steel cover plate 86 surrounds the bellows structure and is maintained in place by a snap ring 88 around the member 82. A suitable annular recess is provided in the steel ring 72 to accommodate the upper end of the cover plate 86.

The cover plate 86 is provided with a plurality of vertical slots 35 spaced therearound to enable the fluid in the well bore to impinge on the outer surfaces of the bellows. The bellows members are thus subject to the pressures exerted by the bore hole fluid. The outer surface of the member 82 is provided with a threaded portion engaging the upper end of the isolating section 36. With the threaded connection between section 36 and member 82 open, removal of the snap ring 88 enables the cover plate 86 to be readily removed, to enable cleaning of the exterior surfaces of the bellows.

The cross-sectional area of the bellows 74 is made considerably larger than that of the bellows 76. As a result, when the external pressure of the bore hole fluid exceeds the internal pressure provided by the oil filling, the large bellows 74 will contract and the small bellows 76 will expand. The opposite pressure relationship will cause the large bellows to expand and the small bellows to contract. Thus, the small bellows permits the expansion and contraction of the large bellows 74 in response to pressure changes while at all times, the lower edge of the bellows 76 remains firmly fastened to the mandrel 44. Therefore, pressure equalization around the transducer is attained without using unreliable moving seals.

The upper end of isolating section 36 is provided with an axial bore serving as a continuation of the bore 52 in the mandrel 44. The lower end of member 82 is also provided with a bore whereby the conductors 54 may pass completely through the instrument.

Although broken away for the sake of convenience of illustration in FIGURES 2B and 2C, the isolating section 36 is of considerable length relative to the size of the transmitter and receiver, as is apparent from FIGURE 1. The greater part of the length of section 36 is provided with an enlarged central bore 90 (FIGURE 2B) leaving a relatively thin outer wall 92. The latter is provided with a plurality of staggered transverse slots 37, as shown best in FIGURE 1. These slots serve to breakup any direct acoustic transmission path for sound signals through the tool itself and effectively delay such transmission for a period of time sufficient to permit the desired signals to reach the receiver without interference. The conductors 54 disposed within the bore 52 of the mandrel 44 pass through the communicating bores in the member 82 and through the fluid tight seal 94 at the upper end of the isolating section 36. A spiral conduit 96, which may be of any noncorrosive material such as stainless steel, contains the conductors 54 within the section 36.

The spiral conduit 96, in addition to being resistant to the corrosive effects of the bore hole fluid with which it is in contact, also is capable of absorbing pressure and temperature variations without straining adjacent fittings or components of the tool. Moreover, its increased length serves to delay the propagation of any acoustic energy that might be directly coupled thereto for a sufficient time as to render it noninterfering at the receiver.

The receiver portion 38 is illustrated in FIGURE 2C and is identical to the transmitter portion 34 in structural detail and mode of operation. Corresponding parts thereof are indicated by the same numerals with a prime (′) added to distinguish therebetween. The operation of the transducer unit 56′ and the bellows 74′, 76′ is identical to that discussed with respect to the transmitting unit and repetition thereof is believed unnecessary.

The lower end of the stainless steel conduit 96 is coupled through a sealing plug 98 at the upper end of the mandrel 44′ to provide a fluid tight connection therebetween. The conductors 57′ are coupled to the respective inner and outer conductive layers 58′, 60′ on the ceramic transducer element 56′ while the remaining conductors 54′ pass through the axial bore 52′ to the casing collar locator portion 40 of the tool (FIGURE 2D). The latter is coupled to the lower end of the mandrel 44′ by means of a coupling sleeve 100 which threadedly engages the mandrel 44′ at its upper end and the sleeve of the casing collar locator portion at its lower end. Suitable sealing rings 102 may be provided in the respective areas of contact.

To ready the tool for operation, the transmitter and receiver sections are filled with oil under slight pressure, for example from zero to 5 p.s.i.g., while the inner bores 52, 52′ contain air at atmospheric pressure. The various seals described in connection with the tool prevent fluid leakages between the various members of the apparatus.

FIGURE 3 illustrates a typical circuit for performing a cement bond log, which circuit would be carried by section 32 of the logging tool. An oscillator 104 controls a pulser 106 to produce a train of high power accurately spaced pulses. The latter are supplied to the acoustic transmitter 108, included within the transmitter portion 34, for providing the acoustic pulses in the bore hole. The acoustic energy is coupled through the fluid filling the bore hole into the well casing 14 and thence downward through the casing towards the receiver portion 38.

The pulser 106 also actuates the pulse generator 110, whose output is used to initiate the cycle of a timer 112. As can be seen from the wave forms in FIGURE 4, the timer commences its operation substantially simultaneously with the initiation of the transmitted acoustic pulse T.

The pulser output also is supplied through delay means 114 and a gate 116 to a pulse generator 118. The electrical pulse provided by the acoustic receiver 120 in response to signals received through the bore hole liquid is also applied to the pulse generator 118. The delay provided by unit 114 is adjusted to actuate the gate 116 just prior to the earliest expected pulse at the receiver. Thus, a received pulse will be effective to actuate the pulse generator 118 to provide a single sharp pulse, as indicated in FIGURE 4.

The output of pulse generator 118 is connected to the timer 112 to shut it off and is also applied to the gate 122. The function of the latter is to render the peak reader 124 operative for a gate interval sufficient to accommodate the first significant peak of the received signal. The latter is coupled directly from the receiver 120 to the input of the peak reader 124. The output of the peak reader is coupled through an amplifier to the recorder 28 at the surface. Similarly, the output of the timer, which is indicative of the elapsed time between the transmitted pulse and the received pulse, $\Delta t$, is also coupled through a suitable output network 126 to the recorder 128 at the surface.

From the foregoing discussion of the cement bond logging operation, it will be apparent that the amplitude of the received acoustic signal, as represented by the output of the peak reader 124, is indicative of the character of the bond between the cement 16 and the well casing 14, at the level at which the measurement is taken. These amplitudes are recorded against depth in the well, which may be established by use of the casing collar locator 40 or apparatus associated with the cable drum 26 at the surface in a well known manner. As previously indicated, if the cement bond is good, the acoustic signal will be substantially attenuated and the output of the peak reader will be relatively low. Should an area of unsatisfactory bonding be encountered, the attenuation will decrease and a higher amplitude output signal will result.

The purpose of the $\Delta t$ measurement is to give added reliability to the measurement. For example, if the signal received at receiver 120 is of insufficient amplitude to trigger the pulse generator 118, this factor will be indicated by the length of the $\Delta t$ measurement. Normally, a pulse should be received at repetitive, equally spaced intervals corresponding to the frequency of the pulser 106, and the output of the timer 112 should be the same for each received pulse. However, when the received signal is lost, either through attenuation or malfunction of one of the circuit elements, one or more cycles may be skipped. This is indicated by the timer output which will then show a longer time interval between received pulses and thereby alert the operators. Continuous and extended cycle skipping could be indicative of a malfunction in the apparatus.

It will be seen from the foregoing that an improved well logging tool has been described which avoids the drawbacks of many of the present day devices. By means of the double bellows construction, the need for sliding or moving seals between the various parts is eliminated and the hazard of infiltration of gases and liquids into the internal structure avoided. Moreover, the construction enables the use of a structurally rugged and relatively impermeable noncorrosive outer covering in place of an elastomer covering which not only is subject to the corrosive effects of the fluids encountered, but which may be easily damaged in operation. The tool of the present invention also is capable of ready dismemberment to permit cleaning and repair of all its constituent parts.

Although discussed in connection with an application for cement bond logging purposes, it will be realized that the principles of the invention may be applied to other acoustic logging techniques and the invention is not to be limited in scope except as provided by the appended claims.

We claim:

1. An electroacoustic transducer unit for operating in a medium under varying pressures comprising a supporting member, an elongated generally cylindrical electroacoustic transducing element surrounding and spaced from said member to define a cavity therebetween, means sealing said cavity at one end of said transducing element, elongated bellows means connected at one end thereof in fluid-tight engagement with the other end of said element and at the other end thereof in fixed, fluid-tight engagement with said supporting member, the interior of said bellows means being in fluid communication with said cavity and the exterior of said bellows means being exposed to the pressure in said medium, and a liquid completely filling said cavity and interior of said bellows means.

2. An electroacoustic transducer unit for operating in a medium under varying pressures comprising a generally cylindrical supporting member, an elongated electroacoustic transducing element surrounding and spaced from a portion of said member to define a cavity therebetween, means at one end of said transducing element sealing said cavity against fluid flow, elongated bellows means concentrically disposed with respect to said supporting member coupled at one end thereof in fluid-tight engagement with the other end of said element and at the other end thereof in fixed, fluid-tight engagement with said member, the interior of said bellows means being in fluid communication with said cavity and the exterior of said bellows means being exposed to the pressure in said medium, and a liquid completely filling said cavity and the interior of said bellows means.

3. An electroacoustic transducer unit for operating in a medium under varying pressures comprising a cylindrical supporting member, a cylindrical electroacoustic transducing element disposed concentrically with and surrounding said member over a portion of its length to define an annular cavity therebetween, means effecting fluid-tight seals between the ends of said element and said supporting member, said means including an elongated bellows surrounding said member and having one end in fluid communication with said cavity and the other end fixed to said member in fluid-tight engagement, the respective ends of said bellows being of different cross-sectional areas and the exterior of said bellows being exposed to pressure of said medium, and a liquid filling the entire chamber formed of said cavity and the interior of said bellows.

4. In a well logging device adapted to be moved through a fluid-filled bore traversing earth formations, an electroacoustic transducer unit comprising an elongated, cylindrical electroacoustic transducing element, a cavity filled with fluid within said element, a non-conductive sleeve surrounding said element, pressure equalization means including an elongated, differential area bellows connected at one end to provide a fluid-tight seal with one end of said element, the other end of said bellows being provided with a fluid-tight closure and being fixed against movement relative to said element, said bellows serving to contain the liquid within said cavity, and an outer covering enclosing said unit, said covering having means to transmit the pressure of the liquid in the borehole to said pressure equalization means.

5. In a well logging device adapted to be moved through a fluid-filled bore traversing earth formations, an electroacoustic transducer unit comprising a cylindrical supporting member, a cylindrical electroacoustic transducing element disposed concentrically with and surrounding said member over a portion of its length to define an annular cavity therebetween, a non-conducting sleeve surrounding said element, means effecting fluid-tight seals between the ends of said element and said supporting member, said means including a differential area bellows surrounding said member and having one end in fluid communication with said cavity and the other end fixed to said member, a liquid completely filling said cavity and the interior of said bellows, and an outer covering enclosing said unit, said covering being provided with apertures to admit the fluid in the bore to the outer surface of said bellows.

6. A well logging device adapted to be moved through a fluid-filled bore traversing earth formations comprising, acoustic transmitter and receiver means spaced apart on said device, connecting means between said transmitter and receiver affording a low velocity path for acoustic signals, said transmitter and receiver each including a central supporting member, an electroacoustic transducing element spaced from and surrounding said member to define a cavity therebetween, pressure equalization means including elongated bellows means fixed at one end to said element and at the other end to said member to provide a fluid-tight seal between said element and said member, a liquid filling said cavity and the interior of said bellows, and an outer cover enclosing each of said transmitter and said receiver means, said covers having apertures therein to subject the respective pressure equalization means to the pressure of the fluid in the bore.

7. A well logging device according to claim 6 wherein the respective outer covers of said transmitter and receiver means and said connecting means are cylindrical and of substantially the same diameter.

8. A well logging device according to claim 7 wherein said connecting means is releasably fastened to said transmitter and receiver, whereby the latter may be readily removed from the remainder of the device.

9. In a well logging device adapted to be moved through a fluid-filled bore traversing earth formations, an electroacoustic transducer unit comprising a central supporting member, a cylindrical electroacoustic transducing element disposed concentrically with and surrounding said member over a portion of its length to define an annular cavity therebetween, a non-conducting sleeve surrounding said element, means effecting fluid-tight seals between the ends of said element and said supporting member, said means including a differential area bellows surrounding said member and having one end in fluid communication with said cavity and the other end fixed to said member, an outer covering enclosing said unit having a first impermeable portion surrounding said non-conductive sleeve in fluid-tight relation and spaced slightly therefrom to provide an annular space therebetween, and a second portion surrounding said bellows and provided with apertures to admit the fluid in the bore, a fluid passage linking said cavity and said annular space, and a liquid completely filling said cavity, said annular space and the interior of said bellows.

10. An electroacoustic transducer unit for operating in a medium under varying pressures comprising a cylindrical supporting member, a cylindrical electroacoustic transducing element disposed concentrically with and surrounding said member over a portion of its length to define an annular cavity therebetween, means effecting fluid-tight seals between the ends of said element and said supporting member, said means including a differential area bellows having a first portion of relatively large cross-sectional area and a second portion of relatively small cross-sectional area surrounding said member, the end of said relatively small cross-sectional area portion being fixed to said supporting member and the other end of said bellows in fluid communication with said cavity, the exterior of said bellows being exposed to the pressure of said medium, and a liquid filling the entire chamber formed of said cavity and the interior of said bellows.

11. A well logging device adapted to be moved through a fluid-filled bore traversing earth formations comprising, acoustic transmitter and receiver means spaced apart on said device, connecting means between said transmitter and receiver affording a low velocity path for acoustic signals, said transmitter and receiver each including a central supporting member, an electroacoustic transducing element spaced from and surrounding said member to define a cavity therebetween, a bellows including portions having different cross-sectional areas surrounding said supporting member and having one end coupled to the corresponding transducing element in fluid communication with said cavity and the other end fixed to said supporting member in fluid-tight engagement, a liquid filling said cavity and the interior of said bellows, and an outer cover enclosing each of said transmitter and said receiver means, said covers having apertures therein to subject the respective bellows to the pressure of the fluid in the bore.

12. In subsurface apparatus adapted to be moved through fluid at varying hydrostatic pressures, the combination comprising a cylindrical supporting member, a hollow cylindrical element secured to and surrounding said member to define a cavity therebetween, a liquid filling said cavity, and means for sealing the ends of said cavity to retain said liquid therein, said means including a differential area bellows having ends of larger and smaller diameter respectively, its end of larger diameter being secured in sealed relation to said element and its end of smaller diameter being secured in sealed relation to said supporting member, said bellows being exposed on one side to said liquid and on the other to said fluid at hydrostatic pressure to equalize the pressure of said liquid with said hydrostatic pressure.

References Cited by the Examiner
UNITED STATES PATENTS

| | | | |
|---|---|---|---|
| 2,218,937 | 10/40 | Myers et al. | 340—18 |
| 2,251,817 | 8/41 | Athy et al. | 340—18 |
| 2,379,996 | 7/45 | Silverman | 340—18 |
| 2,433,746 | 12/47 | Doll | 181—.53 |
| 2,783,449 | 2/57 | Loofburrow | 340—17 |
| 2,790,964 | 4/57 | Schurman | 340—18 |
| 2,868,311 | 1/59 | Tullos | 181—.53 |
| 2,887,172 | 5/59 | Hardway | 181—.53 |
| 3,002,179 | 9/61 | Kuester | 340—8 |

BENJAMIN A. BORCHELT, *Primary Examiner.*

CHESTER L. JUSTUS, SAMUEL FEINBERG,
*Examiners.*